United States Patent
Putkinen

(10) Patent No.: US 9,708,156 B2
(45) Date of Patent: Jul. 18, 2017

(54) METHOD AND APPARATUS FOR CONTROLLING MOVEMENT OF AN ELEVATOR GROUP

(71) Applicant: KONE Corporation, Helsinki (FI)

(72) Inventor: Esa Putkinen, Hyvinkää (FI)

(73) Assignee: KONE CORPORATION, Helsinki (FI)

( * ) Notice: Subject to any disclaimer, the term of this patent is extended or adjusted under 35 U.S.C. 154(b) by 466 days.

(21) Appl. No.: 14/299,657

(22) Filed: Jun. 9, 2014

(65) Prior Publication Data
US 2014/0360817 A1    Dec. 11, 2014

(30) Foreign Application Priority Data
Jun. 10, 2013    (EP) .................................... 13171257

(51) Int. Cl.
*B66B 1/18*    (2006.01)
*B66B 1/24*    (2006.01)

(52) U.S. Cl.
CPC ...... *B66B 1/2458* (2013.01); *B66B 2201/216* (2013.01); *Y02B 50/122* (2013.01)

(58) Field of Classification Search
CPC ............ B66B 1/2458; B66B 2201/216; Y02B 50/122
USPC ....... 187/247, 277, 293, 296, 297, 380–388, 187/391, 393
See application file for complete search history.

(56) References Cited

U.S. PATENT DOCUMENTS

| | | | |
|---|---|---|---|
| 6,199,667 B1 * | 3/2001 | Fischgold | B66B 1/30 187/290 |
| 6,422,351 B2 * | 7/2002 | Tajima | 187/290 |
| 6,435,312 B2 * | 8/2002 | Tajima | 187/290 |
| 6,672,431 B2 * | 1/2004 | Brand | B66B 1/2458 187/247 |
| 7,032,715 B2 | 4/2006 | Smith et al. | |
| 7,540,355 B2 * | 6/2009 | Harkonen | B66B 1/302 187/290 |
| 7,540,356 B2 * | 6/2009 | Smith | B66B 5/027 187/289 |
| 7,588,126 B2 * | 9/2009 | Siikonen | B66B 5/022 187/313 |
| 7,743,890 B2 * | 6/2010 | Nikovski | B66B 1/2458 187/247 |
| 7,909,143 B2 * | 3/2011 | Tyni | B66B 1/2458 187/247 |

(Continued)

FOREIGN PATENT DOCUMENTS

| | | |
|---|---|---|
| CN | 101171195 A | 4/2008 |
| CN | 101323406 A | 12/2008 |

(Continued)

*Primary Examiner* — Anthony Salata
(74) *Attorney, Agent, or Firm* — Birch, Stewart, Kolasch & Birch, LLP

(57) ABSTRACT

Call information can be used for scheduling runs of elevators in a group of elevators. The scheduling is done so that based on the call allocations a schedule of expected movements, accelerations and decelerations can be computed. Then the movements, accelerations and decelerations may be controlled in order to improve energy efficiency or for controlling the movement in such manner that the energy consumption peaks or duration of these peaks is reduced.

20 Claims, 3 Drawing Sheets

(56) References Cited

U.S. PATENT DOCUMENTS

| | | | | |
|---|---|---|---|---|
| 7,971,688 B2* | 7/2011 | Perala | ............... | B66B 1/30 |
| | | | | 187/293 |
| 8,616,338 B2* | 12/2013 | Veronesi | ............... | B66B 1/302 |
| | | | | 187/290 |
| 9,016,440 B2* | 4/2015 | Finschi | ............... | B66B 1/2458 |
| | | | | 187/382 |
| 9,067,762 B2* | 6/2015 | Fargo | ............... | B66B 1/302 |

FOREIGN PATENT DOCUMENTS

| | | |
|---|---|---|
| EP | 2565143 A1 | 3/2013 |
| WO | WO 2005/009880 A1 | 2/2005 |
| WO | WO 2013/030242 A1 | 3/2013 |
| WO | WO 2013/053648 A1 | 4/2013 |

\* cited by examiner

METHOD AND APPARATUS FOR CONTROLLING MOVEMENT OF AN ELEVATOR GROUP

TECHNICAL FIELD

The present invention relates generally to elevators and more particularly intelligent control of elevators belonging to an elevator group.

BACKGROUND OF THE INVENTION

A typical elevator includes an elevator car, a hoisting machine for moving the elevator car, at least one counter weight and traction means such as a rope, cable, chain, or belt. The traction means connect the elevator car and the at least one counter weight to each other. The traction means pass through a traction sheave which is connected to a drive shaft of the hoisting machine.

In a typical elevator having a counter weight the most power demanding situation is at the end of acceleration of a full elevator car into upward direction. When the acceleration ends the need of power is reduced. A similar situation occurs when empty elevator car is accelerated into downward direction. In other words this could be described as accelerating counterweight into upward direction. Thus, because of the counterweight power demanding accelerations can occur both directions.

Because of the weight difference between the elevator car and counter weight varies depending on the load of the elevator car, the actual use of energy also varies accordingly. The energy use depends on how much the hoisting machine needs to assist in accelerations and movement. Furthermore, it is known that sometimes, for example, in the moments of deceleration and moments when net weight is going downwards, energy is released. This released kinetic or potential energy may be transformed into electric power by using the hoisting machine as a generator. The generated electric power may be used for other purposes or fed back to the electric grid. In addition to the weights of the elevator car and compensating weight a person skilled in the art understands that the ropes used are typically heavy, particularly in high buildings where elevator cars are typically large and the ropes are long. These heavy ropes need to be taken into account when the energy demand of an elevator is estimated.

An elevator group comprises at least two elevators. A typical elevator group comprises adjacent elevators in the same building and in some cases the elevators are controlled by a destination control system. When using a destination control system a passenger makes a call, the destination control system registers the call and makes a call allocation. After the user has selected the desired floor, the system informs the passenger to which elevator car he should go, or which elevator car he should wait for. One advantage of the destination control system is that it reduces an average travel time because the elevator car makes fewer stops for individual passengers. A run of an elevator car starts when a brake of the hoisting machine is released and the elevator car starts moving. The run ends when the elevator car stops. The destination control system receives calls and provides information for an elevator group so that the group may be operated more efficiently, for example by optimizing waiting time of each passenger.

Elevator systems are complex and the energy consumption is high especially in high buildings. Thus, it is desirable to reduce energy consumption due to economic and environmental reasons.

SUMMARY OF THE INVENTION

Call information can be used for scheduling runs of elevators in a group of elevators. The scheduling is done so that based on the call allocations a schedule of estimated movements, accelerations and decelerations can be computed. Then the accelerations and decelerations may be controlled according to the schedule in order to improve energy efficiency. For example, when an energy releasing deceleration is expected to follow an energy demanding acceleration, the acceleration can be delayed in order to match the deceleration so that the energy released from deceleration can be used in acceleration. Thus, the user of power from electric grid can be minimized.

Furthermore, the present invention may be used for reducing power peaks from the electric grid. For example, if two very energy demanding simultaneous accelerations are expected, it is possible reschedule these by delaying other of them by a small period of time in order to avoid the simultaneous acceleration. Thus, the required peak power from the electric grid is reduced. A further application of the schedule is to control the use of energy so that fuses are not blown. For example, if a nominal current of a fuse is exceeded, the fuse will last for a certain period of time according to the characteristics of the fuse. After this period of time the fuse will blow. This can be avoided by scheduling runs such that time when the nominal current of a fuse is exceeded is reduced or sometimes even avoided.

A person skilled in the art understands that the elevator car and the counter weight do not have the same weight most of the time as the counter weight typically weighs as much as a half loaded elevator car. When a counter weight of an elevator has a greater mass than the elevator car, or vice versa, it is possible to utilize energy caused by gravity. In more detail, the hoisting machine is used as a generator that transforms a net force into electric current. The electric current can be fed back into a grid. This grid may be a local grid which is used, for example, in a single building, in a set of buildings, or the grid may be a national grid. Alternatively, the current can be fed into a battery, super capacitor or other energy storage.

In an embodiment of the invention a method for controlling movement of elevators being part of elevator group comprising a plurality of elevators is used. The method is initiated by scheduling runs according to calls and already known elevator runs, wherein the schedule comprises at least expected acceleration and deceleration of an elevator. Additionally the schedule may comprise other information, such as current speed derived from the hoisting device, current weight derived from a weighing device, estimated weight derived from the information received from destination control system, and similar information that may be used in order to control the movements more efficiently. From the schedule it is determined the expected use and regeneration of electric energy and power for each elevator in said elevator group. Then the movements of elevators are controlled according to the schedule, wherein the controlling comprises delaying the movement of an elevator as a response to high expected simultaneous use of power by the other elevators of the group or in order improve synchronization of regeneration and usage of electric energy in the group. A benefit of the present invention is that by scheduling runs the overall energy consumption, and in particularly the energy taken from the grid, can be reduced because increased share of regenerated energy can be used locally in the elevator group or at least in the building. This leads into energy and cost savings that are always desirable.

In an embodiment of the invention the invention is implemented as an apparatus comprising a memory, processor and network connection for communicating with other devices and instructing elevators according to the method disclosed above. In a further embodiment the invention is implemented as a computer program. When the computer program is executed in a computing device, such as the apparatus described above, it is configured to cause the method as disclosed above.

A further benefit of the present invention is that a group of elevators can be designed to have lower highest peak power. The reduced highest peak power can be taken into account when designing electricity connection for the elevator group and for the whole building. A further benefit of the present invention is that possible exceeding of the nominal current of a fuse may be controlled.

A further benefit of the present invention is that the information derived from an apparatus according to the present invention can be exchanged with other power demanding systems within the building. Thus, the power demanding operations may be scheduled according to the known or predicted peaks. This scales the above mentioned benefits from the elevator group level to building level.

BRIEF DESCRIPTION OF THE DRAWINGS

The drawings constitute a part of this specification and include some exemplary embodiments of the invention.

DETAILED DESCRIPTION OF THE INVENTION

It is appreciated that the following embodiments are exemplary. Although the specification may refer to "one" or "some" embodiment(s), the reference is not necessarily made to the same embodiment(s), or the feature in question may apply to multiple embodiments. Single features of different embodiments may be combined to provide further embodiments.

Figure 1:
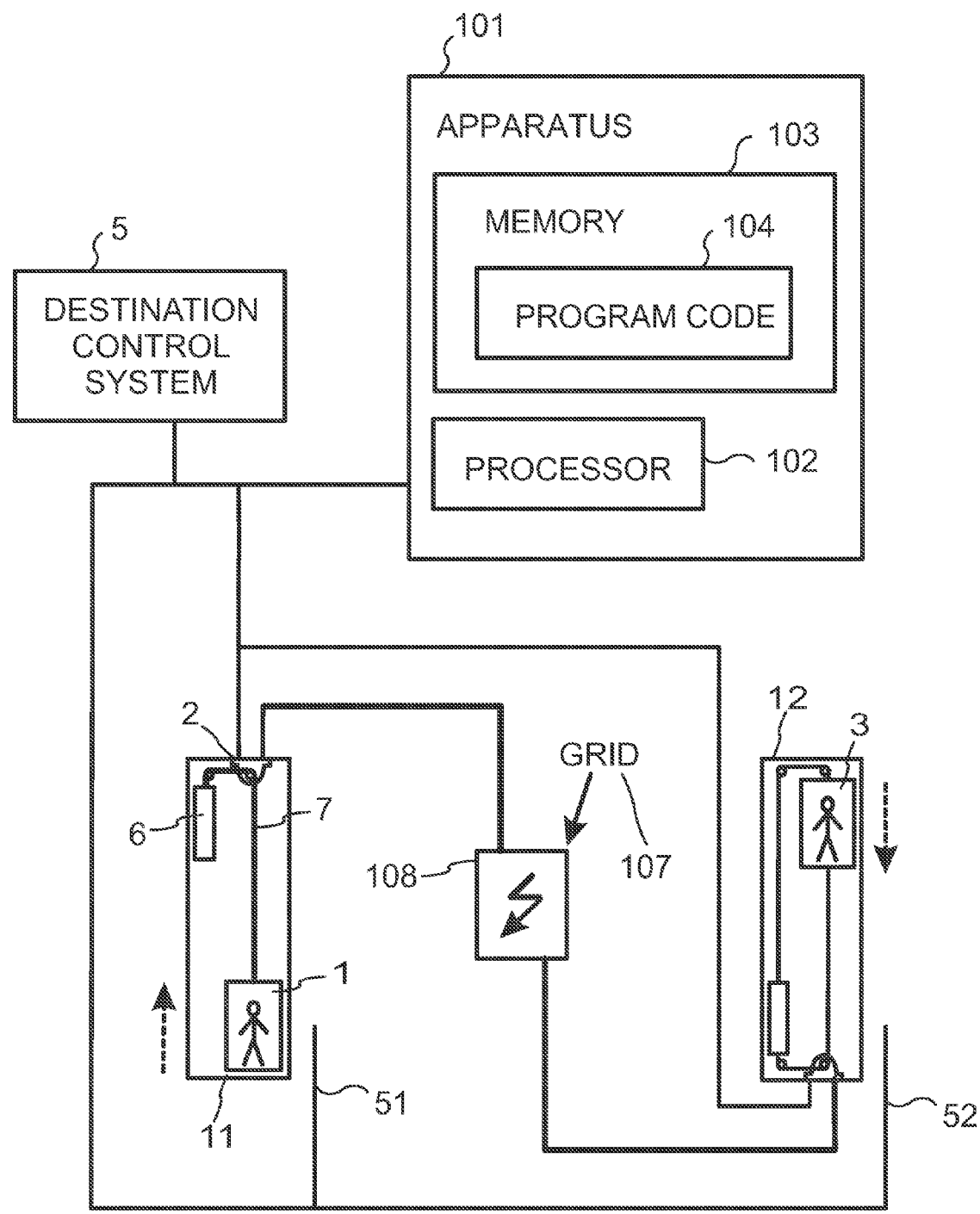
FIG. 1 discloses an embodiment of an apparatus for controlling an elevator group, FIG. 2 discloses a method according to an embodiment of the present invention, FIG. 3a discloses a schedule according to an embodiment of the present invention, and FIG. 3b discloses a modified schedule according to an embodiment of the present invention.

In FIG. 1 an example embodiment using a destination control system are disclosed. The use of destination control system is typical especially in high buildings, however, it is not necessary.

FIG. 1 shows an elevator group comprising a first elevator car 1, a first hoisting machine 2 for moving the first elevator car 1, a second elevator car 3, a second hoisting machine 4 for moving the second elevator car 3, and a destination control system 5. The destination control system 5 receives calls from passengers and part of those calls relate to the next run of the first elevator car 1. At most an allowed maximum number of passengers may use the first elevator car 1 at the same time. The elevator car 1 is connected with traction means 7, such as a rope, cable, chain, or belt, to a counter weight 6. These traction means 7 pass from the counter weight 6 through a diverting pulley and traction sheave to the elevator car 1. The hoisting machine 2 of the first elevator car 1 is attached to the first hoistway 11. There are different ways of attaching the hoisting machine and they are all compatible with the present energy saving arrangement. The second elevator car 3 is connected with traction means to another counter weight. The first elevator car 1 is movable (up and down) in the first hoistway 11 and the second elevator car 2 is movable in the second hoistway 12. In this example the elevators of the elevator group are similar but they could include some differences.

In an embodiment the mass of the half loaded first elevator car 1 corresponds with the mass of the counter weight 6. When the elevator car is less than half loaded, due to gravity, the counter weight 6 aims to move downwards but a brake of the hoisting machine 2 keeps the counter weight 6 in its current location (in the hoistway 11). Thus, potential energy can be used in upward movement of the elevator car. When the brake is released the counter weight 6 moves downwards in the hoistway 11 and the potential energy is transformed into kinetic energy. The kinetic energy moves the traction means and the traction means rotate the traction sheave. In order to provide the desired acceleration the hoisting machine 2 may have to assist the movement. However, sometimes the potential energy is sufficient to provide the desired acceleration and the hoisting machine 2 can be used as a generator arranged to prevent further acceleration by transforming potential energy into electric current. The hoisting machine 5 works accordingly.

FIG. 1 further discloses an embodiment of an apparatus 101 for controlling an elevator group. The apparatus 101 comprises at least one processor 102 and program code 103 stored in at least one memory 104. In the example of figure elevators are of different types and located in different parts of a building or even in different buildings, however, they are connected to the same destination control system 5 and same power supply centre 108. The apparatus 101 is configured to create a schedule of movements of elevators belonging to the group. Typically the schedule comprises accelerations and decelerations of each individual elevator. Additionally the schedule may comprise other information, such as current speed derived from the hoisting device, current weight derived from a weighing device, estimated weight derived from the information received from destination control system, fuse characteristics and similar information that may be used in order to control the movements more efficiently. In a further embodiment the information comprises the speed of the elevator as a continuous function of time. From the function accelerations and decelerations can be derived. The schedule may include also the expected energy demand during ordinary movement between acceleration and deceleration. It is noted that the use of energy may also be negative. In other words, the elevator having negative use of energy is releasing energy that can be transformed into electric power and used somewhere else. Then the apparatus is configured to use the schedule for controlling elevators in an elevator group. For example, if there are two accelerations scheduled at a same moment of time one of the accelerations may be delayed in order to reduce the peak power. Further examples of creating and using the schedule are discussed below with the examples of FIGS. 3a and 3b.

The destination control system 5 is connected to panels 51 and 52 located on each floor. Those panels include a set of buttons by which the passengers make elevator calls. Couplings between other components are illustrated in the figure, however, they are only examples. Any suitable means of connectivity may be used provided that the destination control system is capable of collecting information and sharing it with other devices in the system.

In an example in FIG. 1 the apparatus 101 obtains from the destination control system 5 call allocations according to which the first elevator car 1 is to be moved upwards to the top floor in the first hoistway 11 and the second elevator car 3 is to be moved downwards to the bottom floor in the second hoistway 12. In addition, the apparatus 101 obtains the call allocations for the run in the first elevator car 1 and the call allocations for the run in the second elevator car 3. The masses of the elevator cars are smaller than the mass of the counter weight 6. The allowed maximum number of passengers is six for the both elevator cars 1 and 2. The number of call allocations is one (1) for the run in the first elevator car 1 and the number of call allocations is two (2) for the run in the second elevator car 3. With these numbers (1 and 2) the need of electric current from the grid 107 is minimized because the counter weight 6 of the first elevator is so heavy that the first elevator car 1 can be lifted to the top floor of the first hoistway by gravity. In other words, the first hoisting machine 2 does not use any current but generates current from the potential energy caused by the gravity when the brake of the first hoisting machine 2 is released in the beginning of the run of the first elevator car 1. Because the runs of the elevator cars 1 and 3 take place at least partly at the same time, the electric current generated by the first hoisting machine 2 can be used in the second hoisting machine 4. The apparatus 101 is able to determine this fact on the basis of the run information obtained from the destination control system 5, or from other devices attached to the elevator group. Based on this the power generated may be distributed, for example to the second hoisting machine 4 so that the power demand from the grid is reduced. In a second embodiment the apparatus 101 may be fully integrated into the destination control system 5.

Figure 2:
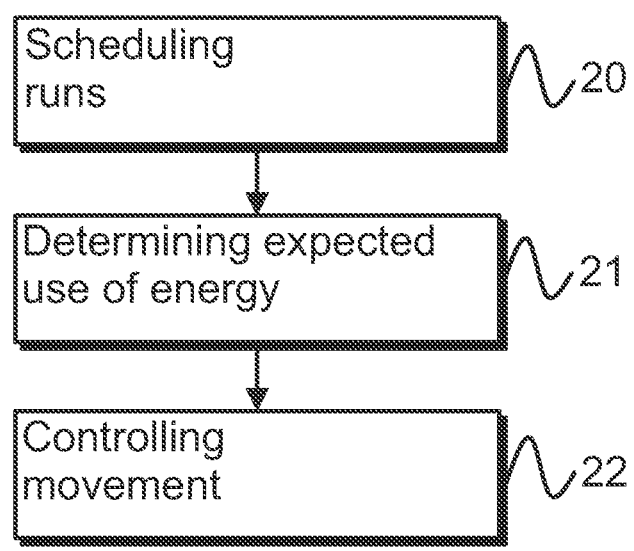

FIG. 2 discloses a method according to an embodiment of the present invention. The method is operated in an elevator group. The elevator group may comprise a destination control system, however, it is not necessary. Examples of such groups with destination control system are presented in FIG. 1.

The method is initiated by scheduling known runs for each elevator in the elevator group, step 20. The schedule comprises information that is relevant to the movement of elevators in said elevator group. For example, when there are plurality of calls for an elevator, accelerations, decelerations and the actual stops can be calculated when the speed of the elevator is known. The current speed can be derived from the hoisting machine and the future speed can be estimated. For example, if an elevator is starting from ground floor and it is called to stop in floors three and seven before reaching the final destination at floor ten, the whole run be scheduled so that from the schedule it can be seen when the elevator is moving and when it is stopped. In the estimate an expected length of stop is used and it may be different for each floor. With destination control system the length can be predicted more accurately when it is known how many people will go in and out. The actual stop lengths may be measured and stored into a database for statistical modelling or the system performing the scheduling may be configured to learn the stop lengths based on the historical data by using, for example, statistical methods, neural networks or similar.

It must be noted, that the above mentioned schedule must be continuously updated. For example, if an elevator stops for longer period because of unexpected human behaviour, the schedule will be updated as it is obvious that the additional delay caused by human will delay the arrival at next called floor and every floor after that. Thus, when it is detected that the estimated schedule cannot be followed the new schedule is computed. Updating can be done, for example, periodically or based on events. The events may include actual events, such as calls, start of acceleration, end of acceleration, stop, change of weight of an elevator car, and similar. In addition to actual events computational events may be used. For example, when the elevator is ready for acceleration after stop "ready for acceleration" event may be triggered. From this event it is known that the elevator is ready for acceleration and will start moving soon.

The resolution of the schedule may be determined based on the need. For example, the resolution may be one second, tenth of a second or whichever resolution is considered necessary.

Based on the schedule of movements the expected energy demand is determined for each elevator, step 21. The expected energy demand is attached to the schedule so that from the schedule it can be seen the expected use or release of energy over predetermined period of time, or if desired, as long period as it is possible to compute. The natural upper limit for the period is the period of time having the latest expected arrival to the final destination. For example, if there are calls only for next 42 seconds the schedule cannot be done further before new calls are received or other decision for moving elevators is made.

The expected energy demand is an estimate of the energy to be used or released by an elevator over the time period mentioned above. The accuracy of the estimate depends on the tools available. For example, the elevator group may use the data obtainable from a destination control system and weighing device attached to each elevator for determining the energy needed for acceleration and moving the elevator according to pending calls. The destination control system may be used for computing an estimate of the weight for oncoming runs when the number of passengers and their destinations is known. Thus, very accurate estimate can be calculated. On the contrary, it is possible that the elevator group does not have destination control system and the weighing device is not capable of providing information to be used for these purposes. Thus, the estimate may be inaccurate, however, also in these cases the moments having potentially high energy demand can be identified. A person skilled in the art understands that the largest energy is needed in the end of accelerating a full elevator car upwards. Thus, these expected moments of acceleration, can be identified as a possible moment of high energy demand. This accuracy can be further refined, for example, by statistical modelling, wherein the model is based on actual used energy. For example, based on that it is possible to estimate the significance of rush hours and departure floors.

In the paragraph above the energy consumption is discussed. A person skilled in the art of elevators is aware of the fact that not all runs are energy consuming but the hoisting machine can be used a generator. For example, when a full elevator car is going down it weighs more than counterweight and the hoisting machine actually generates energy that can be used by other elevators in the same group or fed back to the electricity grid. Correspondingly, if an empty car is going up the counterweight weighs more than the car and energy can be generated from this movement. These moments of generating energy are included in the schedule. Thus, the expected energy demand may also be negative meaning that there is energy available.

As a result of step 31, a schedule including the expected energy demand for each elevator in the elevator group is derived. The energy consumption of the whole elevator group can be derived by accumulating the expected energy demand of each elevator in said group.

The above described schedule including the expected energy demand is then used for controlling the movement of elevators in the elevator group, step 22. The information available can be used for optimizing the overall energy consumption of the elevator group and reducing the power consumption peaks so that the power supply of the elevator group needs not to be designed according to the theoretical highest peak that is caused by simultaneous acceleration of full elevator cars. In the controlling step 22 the moments of high energy demand are identified and if they occur simultaneously they are rescheduled so that the energy demanding events do not occur exactly at the same period. For example, if two accelerations are occurring at the same time, other of the accelerations is delayed by small period of time so that the first elevator car has finished acceleration before the second elevator car starts. Typically the delay is no longer than 3-5 seconds as after that passengers of the elevator car typically consider the service of quality lower than expected. After delaying the schedule is updated as disclosed above. As disclosed above the energy demands is at highest level at the end of the acceleration. Thus, the highest peak energy consumption can be avoided also with smaller delays that do not prevent simultaneous acceleration completely but delay the second car only as much as needed.

Figure 3A:
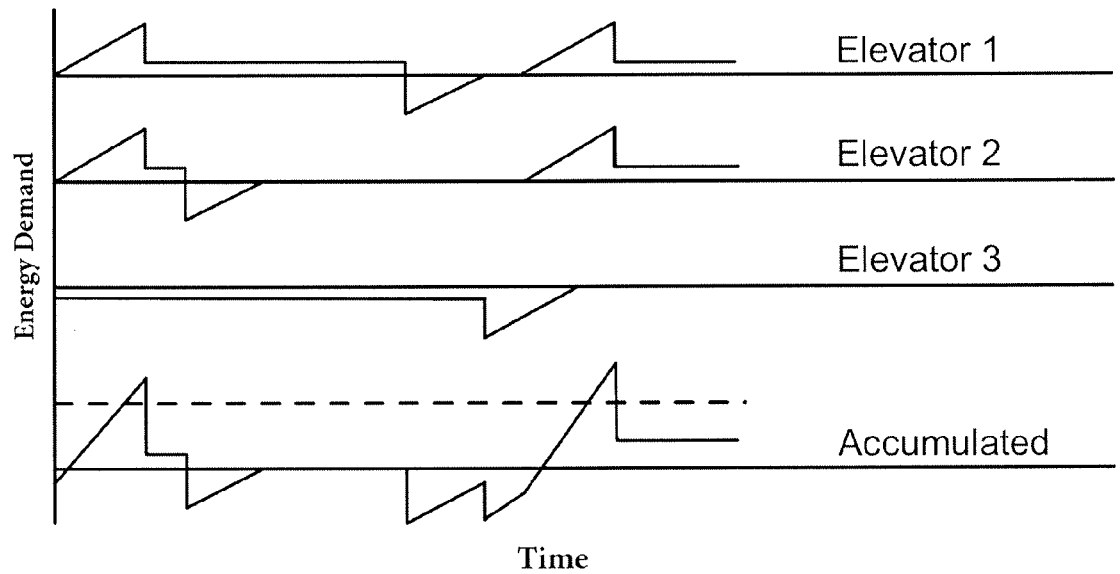
Figure 3B:
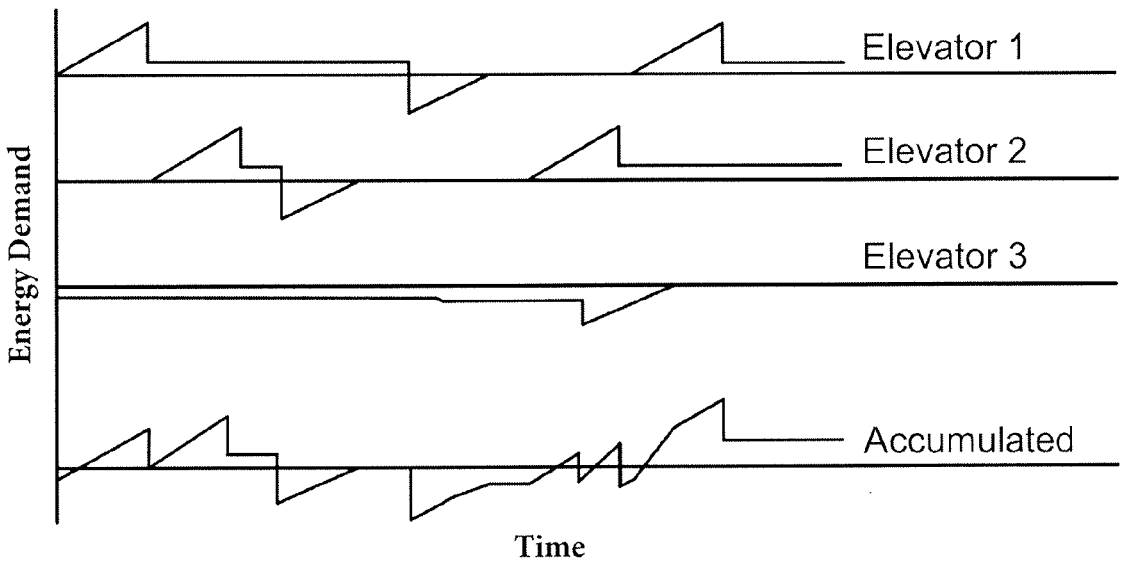

In FIGS. 3a and 3b the schedule is explained in more detail. It is essential to understand that the energy levels used in the figures are examples only and the expected used or released energy varies by embodiment basis. Thus, the following description should be used as an example that helps understanding the principles of the present invention.

FIG. 3a discloses an example of a schedule with expected energy demand. The purpose of the figure is to illustrate use of schedule, the energy saving potential and to make the general working principle of the invention clear for a person skilled in the art. Thus, the scale and units are not disclosed. Thus, it corresponds with the situation after step 21 in FIG. 2. In the figure three elevators and accumulated expected energy demand are illustrated. The expected energy demand is illustrated as a function of time. At the starting moment elevators 1 and 2 are accelerated simultaneously. After that first elevator travels longer distance before braking. The second elevator travels only short distance, such as a couple of floors in high building and then stops for waiting new calls. When the new call comes it causes the second elevator to accelerate again at the same time as the first elevator. Third elevator is travelling longer distance and it is actually releasing energy before braking. At the accumulated line the high peaks of energy use can be seen at two occasions, the latter being a little bit higher. It can be seen from the figure that these two moments of simultaneous accelerating demand high energy. The stroked line will be explained below.

In FIG. 3b discloses a situation wherein the controlling movement according to schedule involves rescheduling. When FIGS. 3a and 3b are compared it can be seen that the second elevator is accelerated only after the acceleration of the first elevator is over. From the accumulated expected energy demand it can be seen that the required peak power is a lot less when the accelerations do not happen at the same moment. The similar delaying is done for the first elevator in the second simultaneous acceleration. Thus, both elevators are delayed equal amount of time and good service level can be maintained. From FIG. 3b it can be seen that the deceleration of the third elevator occurs later than in FIG. 3a. This can be achieved by reducing the speed before the acceleration so that the elevator arrives at the destination a little bit later. As the braking is started earlier the braking energy is also generated earlier. Thus, in the final braking there is not as much energy to release as it would have been if the braking was started from the full speed.

The stroke line in FIG. 3a is drawn at the level of the highest accumulated peak of FIG. 3b. Thus, it can be seen that after rescheduling the peaks are set at a lower level. Thus, the capacity of the power supply can be reduced in order to save money. Furthermore, the braking energy of elevator 3 is now used within the elevator group thus providing lower overall power consumption.

In a further embodiment of the invention, when the overall energy consumption is negative, i.e. the elevator group is generating power the power is fed back to the grid. In a further embodiment an apparatus according to the present invention the apparatus is connected to building technology so that it can communicate with other electric systems in order to provide information about the expected need of power and expected capability of regenerating electric power. Thus, other power demanding tasks may be optimized correspondingly in a manner that the power does not need to be fed back to the power grid outside the building.

The above mentioned method may be implemented as computer software which is executed in a destination control system, such as the apparatus disclosed above. When the software is executed in a computing device it is configured to perform the above described inventive method in order to facilitate discovery resources in a mobile communication network. The software is embodied on a computer readable medium so that it can be provided to the computing device.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Common forms of computer-readable media include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, suitable memory chip or cartridge.

All or a portion of the exemplary embodiments described in the above can be implemented using known formulas, elevator components, a processor etc. One or more persons skilled in electronics and/or mechanics are able to advice preparation of the program code that is needed in the implementation of the invention.

While the invention has been described in connection with a number of exemplary embodiments, and implementations, the invention is not limited to them, but rather covers various modifications which fall within the purview of prospective claims.

The invention claimed is:

1. A method for controlling movement of an elevator group comprising a plurality of elevators, the method comprising:
    scheduling runs according to calls and already known elevator runs, wherein the schedule comprises at least moments of expected acceleration and deceleration of an elevator;
    determining expected energy demand for each elevator in said elevator group;
    controlling the movement of elevators according to the determined expected energy demand, wherein the controlling comprises delaying the movement of an elevator in accordance with the schedule and modifying the acceleration and/or speed of at least one elevator of the plurality of elevators during an elevator run to reduce peak power consumption of the elevator group.

2. The method as in claim 1, wherein said delaying comprises delaying the start of an acceleration of an elevator.

3. The method according to claim 1, wherein said delaying comprises slowing the speed of a moving elevator.

4. The method according to claim 1, wherein the method comprises using a destination control system in collecting data for said method.

5. The method according to claim 1, wherein the method comprise exchanging data with other systems of a building comprising the elevator group to provide information about the expected energy demand.

6. The method according to claim 1, wherein each elevator comprises a counter weight.

7. The method according to claim 1, wherein the schedule comprises speed as a continuous function of time for each elevator in said group.

8. A computer program comprising code adapted to cause the method according to claim 1 when executed on a data-processing system.

9. An apparatus for controlling movement of a plurality of elevators of an elevator group, the apparatus comprises:
   a memory configured to store collected data;
   a processor configured to process said collected data;
   at least one connection configured to communicate with external devices,
   wherein the apparatus is further configured to:
      schedule runs according to calls and already known elevator runs, wherein the schedule comprises at least moments of expected acceleration and deceleration of an elevator;
      determine expected energy demand for each elevator in said elevator group;
      control the movement of elevators according to the determined expected energy demand, and
   wherein the controlling comprises delaying the movement of an elevator in accordance with the schedule and modifying the acceleration and/or speed of at least one elevator of the plurality of elevators during an elevator run to reduce peak power consumption of the elevator group.

10. The apparatus as in claim 9, wherein said delaying comprises delaying the start of an acceleration of an elevator.

11. The apparatus as in claim 9, wherein said delaying comprises slowing the speed of a moving elevator.

12. The apparatus according to claim 9, wherein the apparatus is configure to receive said collected data from a destination control system.

13. The apparatus according to claim 9, wherein the apparatus is further configured to exchange data with other systems of a building comprising the elevator group to provide information about the expected energy demand.

14. The apparatus according to claim 9, wherein each elevator comprises a counter weight.

15. The method according to claim 2, wherein said delaying comprises slowing the speed of a moving elevator.

16. The method according to claim 2, wherein the method comprises using a destination control system in collecting data for said method.

17. The method according to claim 2, wherein the method comprise exchanging data with other systems of a building comprising the elevator group to provide information about the expected energy demand.

18. The method according to claim 1, wherein at least one of the plurality of elevators comprises a generator, and the method further comprises:
   during deceleration of the at least one of the plurality of elevators, the generator converts potential energy of the at least one elevator into electric current.

19. The method according to claim 18, the method further comprises:
   using the electric current generated from the deceleration of the at least one of the plurality of elevators to operate another one of the plurality of elevators.

20. The apparatus according to claim 9, wherein at least one of the plurality of elevators comprises a generator, and the method further comprises:
   during deceleration of the at least one of the plurality of elevators, the generator converts potential energy of the at least one elevator into electric current.

\* \* \* \* \*